United States Patent
Algie et al.

(10) Patent No.: US 11,418,636 B1
(45) Date of Patent: Aug. 16, 2022

(54) SMART LIGHT SWITCH WITH DISPLAY

(71) Applicant: Alarm.com Incorporated, Tysons, VA (US)

(72) Inventors: Glenn Algie, Tysons, VA (US); Casey Hutchinson, San Francisco, CA (US); Doug Mendonca, Oakhurst, CA (US); Steven George Dodson, Redwood City, CA (US)

(73) Assignee: Alarm.com Incorporated, Tysons, VA (US)

( * ) Notice: Subject to any disclaimer, the term of this patent is extended or adjusted under 35 U.S.C. 154(b) by 230 days.

(21) Appl. No.: 16/877,391

(22) Filed: May 18, 2020

Related U.S. Application Data

(60) Provisional application No. 62/848,693, filed on May 16, 2019.

(51) Int. Cl.
| | |
|---|---|
| *H04L 12/00* | (2006.01) |
| *H04L 69/324* | (2022.01) |
| *H04L 12/28* | (2006.01) |
| *G06F 3/16* | (2006.01) |
| *G06F 3/14* | (2006.01) |

(52) U.S. Cl.
CPC .............. *H04L 69/324* (2013.01); *G06F 3/14* (2013.01); *G06F 3/165* (2013.01); *H04L 12/281* (2013.01); *H04L 12/2803* (2013.01); *H04L 12/2807* (2013.01)

(58) Field of Classification Search
CPC . H04L 69/324; H04L 12/2803; H04L 12/281; H04L 12/2807; H04L 12/282; H04L 12/2818; H04L 12/2816; G06F 3/165; G06F 3/14

USPC .......................................................... 370/474
See application file for complete search history.

(56) References Cited

U.S. PATENT DOCUMENTS

| | | | |
|---|---|---|---|
| 9,153,126 B2 | 10/2015 | Chen et al. | |
| 2016/0330042 A1 | 11/2016 | Andersen | |
| 2017/0279950 A1* | 9/2017 | Auranen | H04M 1/72412 |
| 2017/0347421 A1 | 11/2017 | Picco | |
| 2018/0013579 A1* | 1/2018 | Fairweather | H04L 12/40032 |
| 2018/0234726 A1* | 8/2018 | Allstead, Jr. | H04N 21/8547 |
| 2019/0353337 A1* | 11/2019 | Deng | H01H 23/12 |

(Continued)

FOREIGN PATENT DOCUMENTS

| | | |
|---|---|---|
| TW | I478049 | 3/2015 |

*Primary Examiner* — Robert J Lopata
(74) *Attorney, Agent, or Firm* — Fish & Richardson P.C.

(57) ABSTRACT

Methods, systems, and apparatus, including computer programs encoded on a computer storage medium, for integrating one or more light switch panels into a monitoring system. The methods, systems, and apparatus include actions of determining to communicate a non-traditional file to a z-wave capable device, communicate a first data packet to the z-wave capable device, based on communicating the first data packet to the z-wave capable device, alter a schedule command class payload of a second data packet to include a first portion of the non-traditional file, alter a schedule command class payload of a third data packet to include a second portion of the non-traditional file, and alter a schedule command class payload of a fourth data packet to include a third portion of the non-traditional file, and communicate, to the z-wave capable device, the altered second data packet, the altered third data packet, and the altered fourth data packet.

20 Claims, 9 Drawing Sheets

(56) References Cited

U.S. PATENT DOCUMENTS

| | | | |
|---|---|---|---|
| 2020/0004496 A1* | 1/2020 | Park | H04L 47/22 |
| 2020/0252233 A1* | 8/2020 | O'Keeffe | H04L 67/306 |
| 2020/0401555 A1* | 12/2020 | Magazine | G06F 16/48 |
| 2021/0168578 A1* | 6/2021 | Krovvidi | G06F 3/167 |
| 2021/0385144 A1* | 12/2021 | Rauenbuehler | H04L 12/2854 |
| 2021/0400348 A1* | 12/2021 | Mixter | H04N 21/4532 |

* cited by examiner

SMART LIGHT SWITCH WITH DISPLAY

CROSS-REFERENCE TO RELATED APPLICATIONS

This application claims the benefit of U.S. Provisional Application No. 62/848,693, filed May 16, 2019, which is incorporated by reference in its entirety.

TECHNICAL FIELD

This disclosure relates to property monitoring technology.

BACKGROUND

Many people equip homes and businesses with monitoring systems to provide increased security for their homes and businesses.

SUMMARY

Techniques are described for monitoring technology. For example, techniques are described for integrating one or more light switch panels into a monitoring system.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for integrating one or more light switch panels into a monitoring system. Each of the one or more light switch panels are e-ink display panels that may be mounted to the wall of a room, and are configured to display user configurable content. In some examples, the one or more light switch panels may be an LCD, OLED, or any other appropriate display panel. A light switch panel is a z-wave capable device that is configured to communicate with the control unit at the monitored property. The light switch panel displays the status of the one or more lights at the monitored property. For example, the light switch panel may display that light X and Y are switched on, and light Z is switched off. In some examples, the light switch panel displays the status of one or more other electronic devices at the monitored property. For example, the light switch panel displays that the connected speaker is powered on, and the smart television is powered off.

Figure 1A:
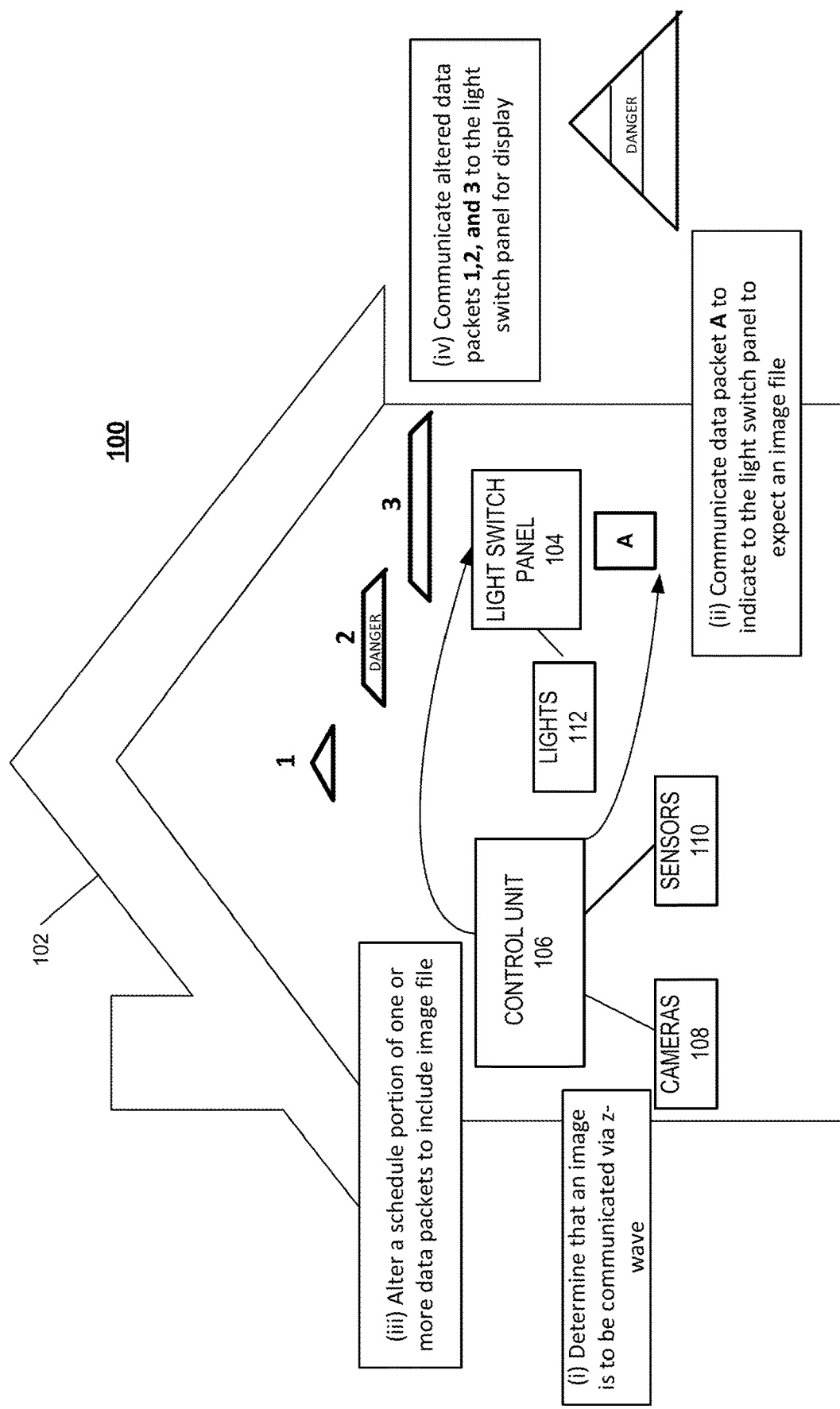
FIG. 1 A illustrates an example of a system for communicating data to a light switch panel at a monitored property.
FIG. 1B illustrates the communication of data at a monitored property.

FIG. 1A illustrates an example of a monitoring system 100 integrated with a light switch panel 104. As shown in FIG. 1A, a property 102 (e.g. a home) of a user is monitored by an in-home monitoring system (e.g. in-home security system) that includes components that are fixed within the property 102. The in-home monitoring system may include a control unit 106, one or more cameras 108, one or more sensors 110, one or more lights 112, and one or more light switch panels 104. The user may integrate the one or more light switch panels 104 into the monitoring system, and may configure the data displayed at each of the one or more panels. In some examples, the light switch panel display may be an LCD display.

During the configuration of the one or more light switch panels 104, the control unit 106 may transfer one or more images, one or more audio files, and text files via z-wave to each of the one or more z-wave capable light switch panels 104. In some implementations, the one or more image files, audio files, and text files are transferred from a broadband panel that supports z-wave communication, and is in communication with the one or more light switch panels 104 and the control unit 106. The z-wave communication protocol is a light weight communication protocol that is typically used to communicate commands to devices such as binary switches and light dimmers. For example, z-wave communication can be used to command a garage door to close, or a door knob to lock. Enabling the transfer of image, audio files, and text files to the light switch panel 104 provides the user with a lightweight low energy file transfer. The user has the ability to add one or more images, audio files, and text files to the files stored at the light switch panel. This allows the user more options for the type of data that may be displayed at the light switch panel 104.

In some implementations, the user may access a smart home application 442 running on their user devices 440 or 450 to identify the one or more files to make available at the light switch panel 104. The user may identify one or more audio files and one or more image files. For example, the user may wish to display Halloween images in October. The control unit 106 may be in communication with a server that manages the smart home application, and may receive the user selected preferences. In some implementations, the user may set a timing schedule that identifies a time when a particular file should be available at the light switch panel. The control unit 106 may communicate the selected file to the light switch panel in advance of the specified time. The user may append time restrictions to the availability of a particular file. For the example with the Halloween images, the user may specify, through the smart home application, that the Halloween images be automatically deleted on November 1.

As illustrated in FIG. 1A, when the user selects to communicate an image file to the z-wave capable light switch panel 104, the control unit 106 determines that the image file is an image file. The control unit 106 then communicates a data packet A to the light switch panel 104 to indicate to the light switch panel 104 to expect an image file. The data packet may be communicated to the light switch panel via z-wave communication. In some implementations, the data packet indicating that an image file is expected via z-wave may be communicated by another communication protocol. In some implementations, the data packet A may be communicated to the light switch panel 104 in advance of the one or more data packets that include the image file. In other implementations, the data packet A may be communicated to the light switch panel simultaneously with the one or more data packets that include the image file.

The control unit 106 includes a segment transport manager that supports one or more Transport specific file conversion methods. Each conversion has an encoder and decoder method. A transport specific encoder converts a data file portion to properly formatted records for example to the underlying OTA transport type data transfer interface. Similarly, the segment transport manager has a different encoder conversion method for supplying specially formatted data records to the schedule command class transport type data transfer interface. The segment transport manager may build one or more manifest segment files using one or more of these selected conversion file methods. Each manifest segment file has a header record to indicate the transport segment type encoder conversion method used for example a Schedule command class or OTA transport transfer method and includes the number and size of converted records. In addition to this header record that describes the nature of converted file records it also has the actual converted records.

The 'SCHEDULE_SET' command of the Schedule Command Class may be used to transport a segmented data file by utilizing one or more existing schedule fields (e.g., month, data, weekday, hour, minute, duration, etc.) to convey a unique mapping generated by the segment-transport-manager. The mapping information (also referred to above as header record of a manifest segment file) is set as the initial record to the Schedule Command Class interface in control unit 106 and is sent from the control unit 106 to the light switch panel 104.

A corresponding decode converter method exists for each transport segment type. Both control unit 106 and light switch panel 104 segment transport mangers have both encode and decode conversion methods for each support transport segment type. The capabilities of a light switch panel 104 are signaled to the control unit as part of typical bring up synchronization data.

Figure 1B:
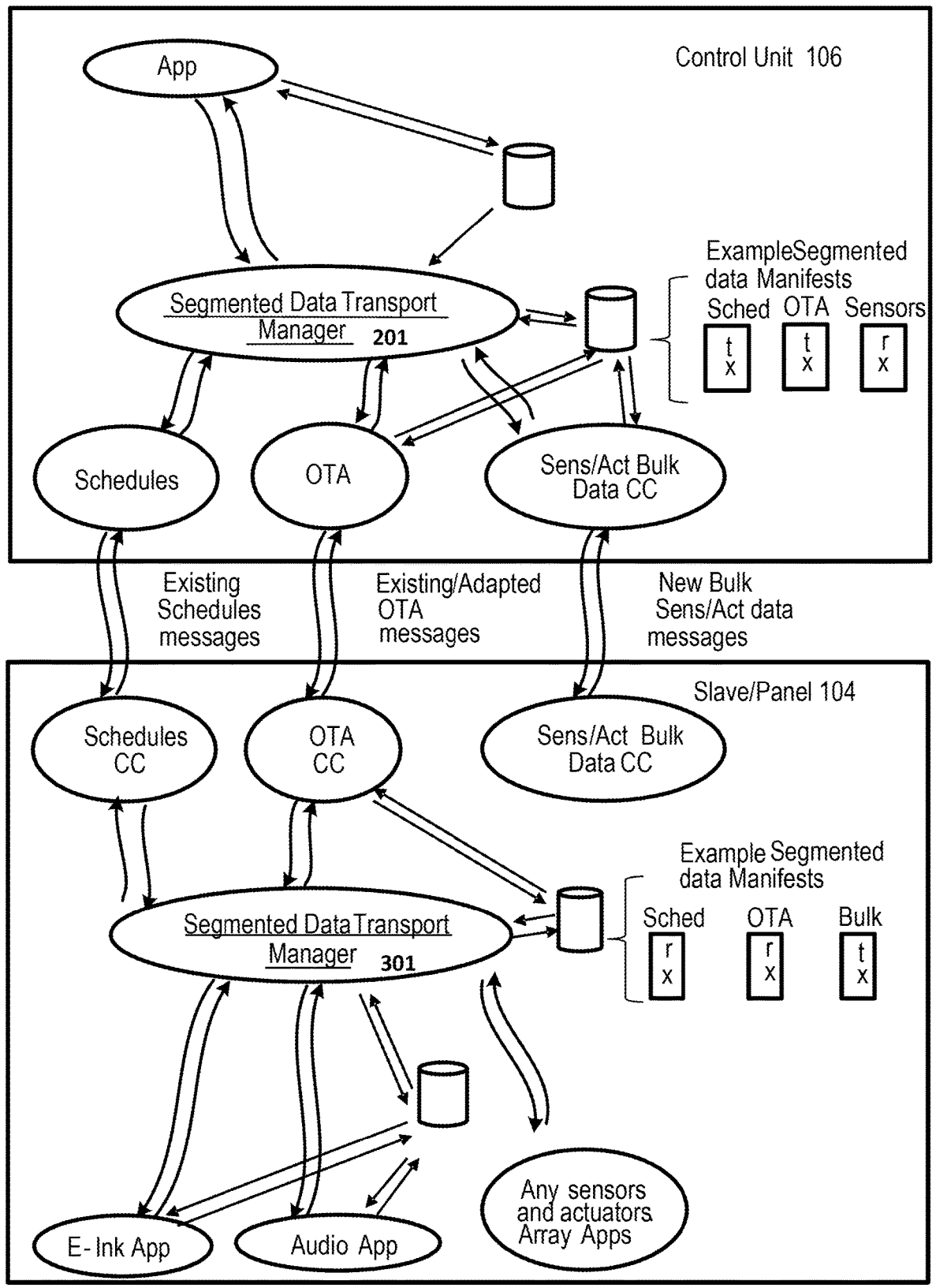
Figure 6:
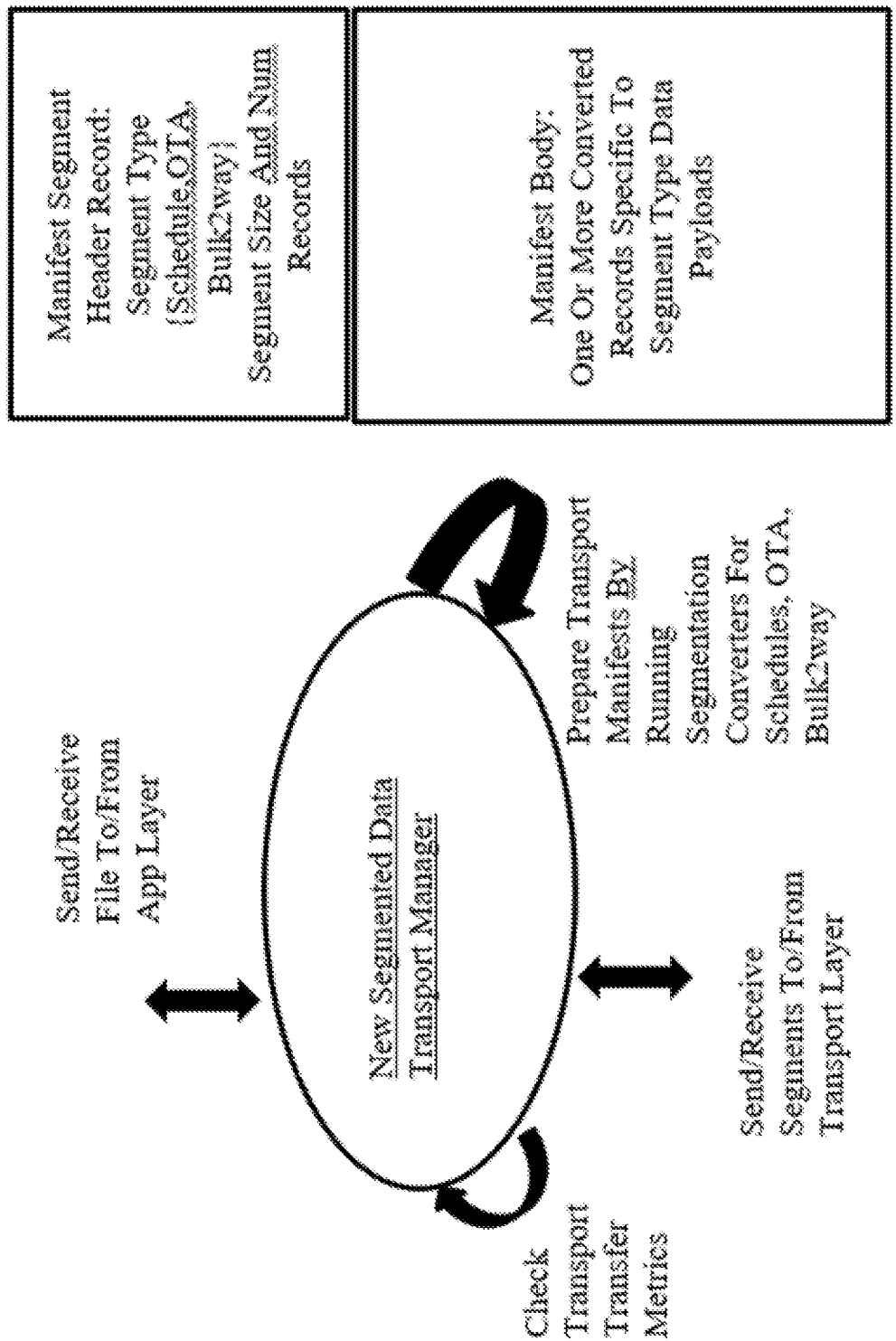
FIG. 6 illustrates an example of a Segmented Data Transport Manager manifest transfer file format and steps.
Figure 7:
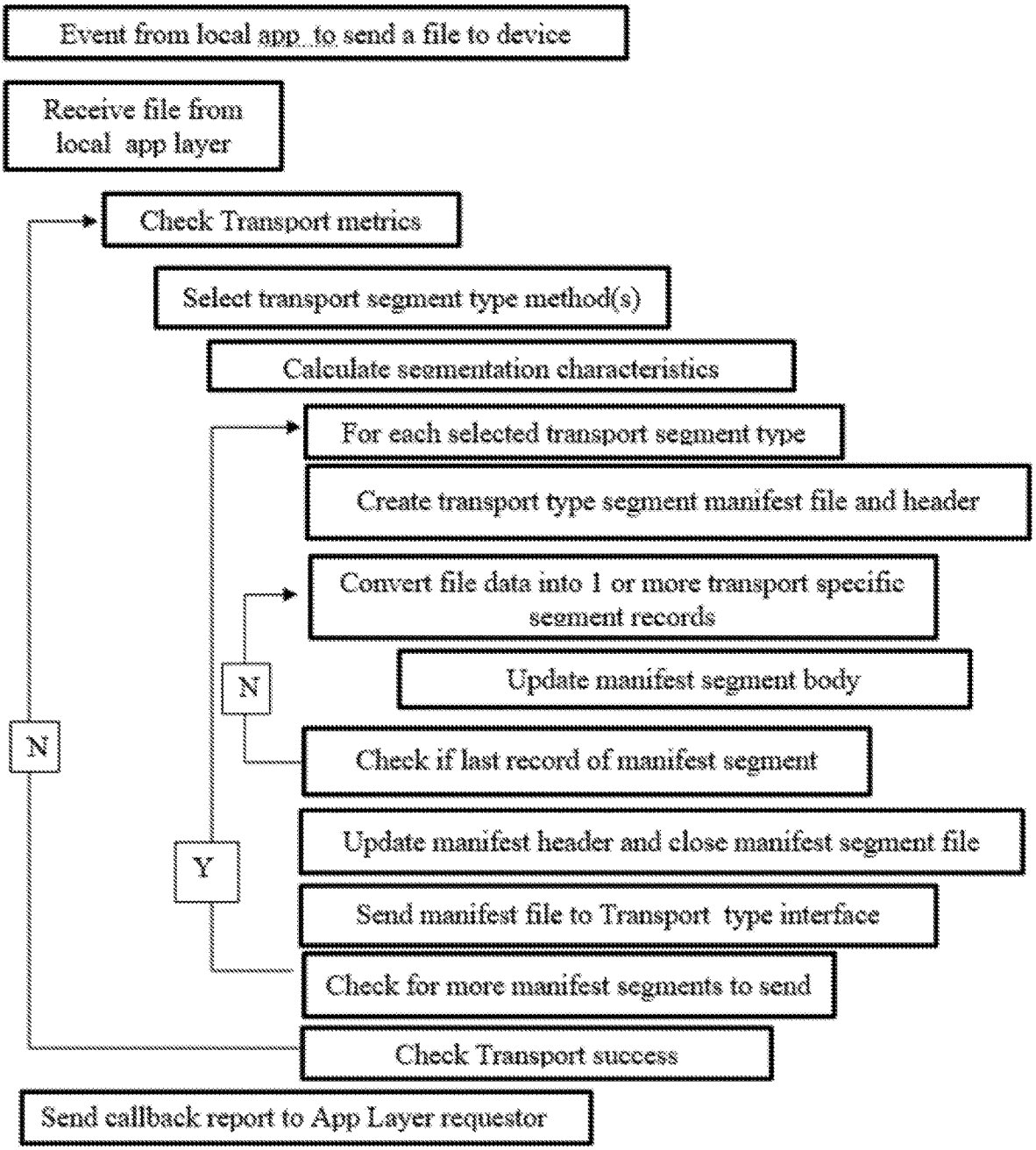
FIG. 7 illustrates steps a segment transport manager uses to receive a non-traditional data file from a local App layer.
Figure 8:
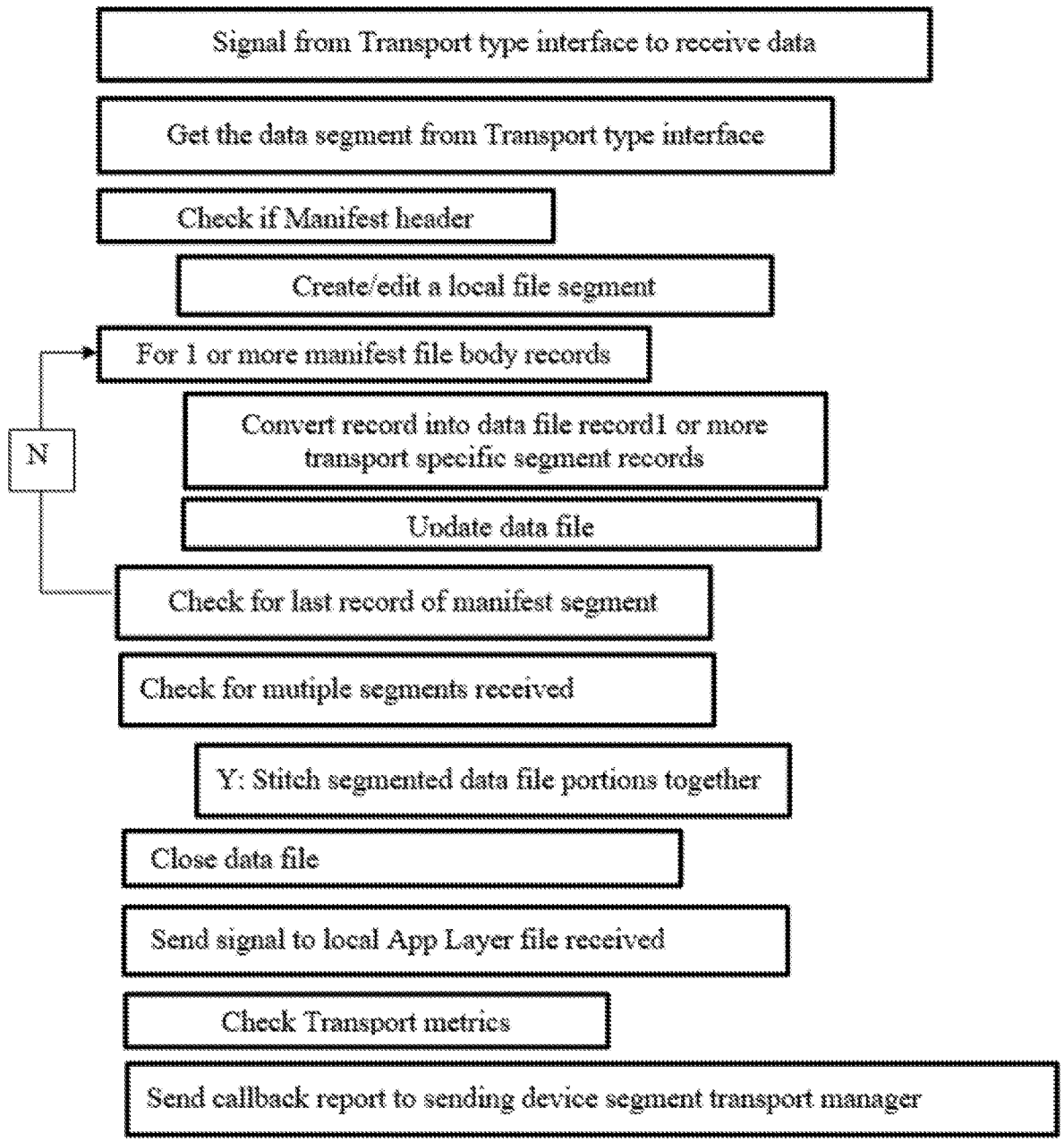
FIG. 8 illustrates steps a segment transport manager uses to receive one or more segmented manifests from its local transport type data OTA transfer interface.

FIG. 6 illustrates an example of a Segmented Data Transport Manager manifest transfer file format and steps. FIG. 7 illustrates steps a segment transport manager uses to receive a non-traditional data file from a local App layer, for example in control unit 106 to transmit to light switch panel 104. FIG. 8 illustrates steps a segment transport manager uses to receive one or more segmented manifests from its local transport type data OTA transfer interface, for example in the light switch panel to send to a local App layer E-ink display. In FIG. 7 the segment transport manager runs decode convert techniques for each manifest segment transport type such as OTA, Schedule or Bulk transport interfaces as illustrated in FIG. 1B. In FIG. 7 the segment transport manager receiver flow includes reassembly of 1 or more converted manifest segments data file portions back to the original App layer data file format that was provided to the transport segment manager in the App layer sender device.

For an E-ink image file send example to be communicated to the light switch panel 104, the segment transport manager in the monitor control unit 106 would receive the image file for example from an application in the monitor control unit 106 and will then choose one or more transport methods such as Schedule command class or OTA method based on the capabilities of the light switch panel 104. Next, the segment transport manager in the monitor control unit 106 will construct a manifest file and create a manifest header record indicating the type of transport method and size of records that are formatted specifically for the chosen transport method. Next, using the selected encoding conversion technique(s), for example the schedule command class, the segment transport manager will convert an image file portion to fit transparently into the first schedule command class payload to include one portion of the image file. The schedule command class payload may refer to a portion of a data packet that would typically include data that specifies commands to follow according to the Z-Wave Application Command Class Specification. For example, the payload may be the one or more existing schedule fields (e.g., month, data, weekday, hour, minute, duration, etc.) in the 'SCHEDULE_SET' command of the Schedule Command Class Next, the segment transport manager would convert a second data packet to include a second portion of the image file, and next convert a third data packet to include a third portion of the image file. In some examples, the segment transport manager in control unit 106 may transparently convert several of schedule command class formatted data packets to include a portion of the image file. The manifest control file header indicates how many records and of which type of converted records it has. In other examples, the segment transport manager in monitor control unit 106 may alter the schedule command class payload of a single data packet to include the image file. In another example, the segment transport manager here may decide on multiple manifest files for spreading the image file over multiple chosen transport methods such as both Schedule and OTA data transfer interfaces for different portions of the same image file.

As shown in FIG. 1B, the segment transport manager of the control unit 106 alters and communicates one or more altered data packets to the light switch panel 104. The light switch panel 104 may be configured to decode the one or more received data packets to access the image data. For example, the light switch panel 104 segment transport manager is configured to access the portion of the image file from the one or more data packets of the Schedule command class and reconstruct the one or more portions of the image file. The light switch panel segment transport manager has decoding conversion methods for each type of data file transfer it supports such as a schedule command class and OTA data file transfer. The segment transport manager in light switch panel 104 receives the manifest control file header records to know how to decode the one or more converted portions of the image file that was partitioned and converted and sent over the one or more of selected transport methods by the monitor control unit 106 segment transport manager. The light switch panel 104 segment transport manger reassembles and stores the image file in its memory and hands it off to the application layer E-ink display for example that may display the file at the panel when required.

In some implementations, the control unit 106 may transfer one or more images, one or more audio files, and/or one or more text files via z-wave to a light switch panel 104 using an over the air (OTA) file transfer method. The control unit 106 may communicate with a light switch panel 104 using the OTA file transfer method when the light switch panel 104 supports the OTA file transfer method. In these implementations, when the user selects to communicate an image file to an OTA file transfer method capable light switch panel 104, the control unit 106 communicates an adapted boot file to the light switch panel 104. The adapted boot file may include a header that notifies the light switch panel 104 that the boot file is an adapted boot file. When the adapted boot file is communicated to light switch panel 104, the light switch panel 104 determines that the adapted boot file is an application file based on the data in the header of the adapted boot file. The light switch panel 104 triggers an application layer to run the application file to output the image file, the audio file, or the text file. For example, the control unit 106 may communicate a firmware update file to the light switch panel 104, the firmware update file may include a header that indicates the file is an application file then when executed generates an image file, audio file, or text file at the light switch panel 104. For another example, the segment transport manager of the control unit 106 may communicate an adapted boot file to a chime device 458. The chime device 458 determines that the adapted boot file is an application file that generates an audio file, image file, or text file at the chime device 458.

In some implementations, the light switch panel 104 may include a sensory capture or gathering function. In these implementations, an image or audio based or multiple environmental sensor array capture function may produce, for example, an image, audio, text, or data file. The image, audio, text, or data file may use a similar but reverse file transmission path method where the file is also segmented into smaller transparently encapsulated data packets. The encapsulated data packets are communicated as a set of sequential data segments to the control unit 106 using a new command class. The data packets are then reassembled into a data file, triggering the application level method to retrieve it. For data destined to the control unit, this may be enabled with a new z-wave communication command class.

In some implementations, the sensory data capture file may use a similar metadata marking header that describes the content, segmentation characteristics, transport paths, and reassembly methods to use. A segment transport manager may manage the segmentation and reassembly of the data segments. In some implementations, the segmentation manifest structure may include header data of characteristics of segmentation method used that is pertinent to reassembly. The segmentation manifest may also include all the segments specific to each transport method selected. For example, the selected transportation method may include a schedule or OTA based existing transport methods. In some implementations, one or more segmentation manifests may exist to allow multiple transport paths to be used by the segment transport manager either at the same time in parallel or in a serial fashion. These are decisions made by the segment transport manager based on an evaluation of the paths in the mesh to the destination device.

A common segmentation and reassembly method could be used regardless of which way the data file is sent. The transfer method may include prefixing data to indicate the type of data it represents and to which application or session the data file's destination is. Both the segmentation and reassembly methods have a segment transport manager. Segmentation and reassembly methods may be further adapted based on whether segmented items are to be encapsulated into a schedule command class, adapted OTA based container, or a new Z-wave command class. The segment transport manager may use one or multiple transport methods in parallel or sequentially depending on characteristics of transport medium or paths available between the source device and receiving device of the data file.

The control unit 106 may determine the best method to transport data based on: 1) the command class supported capabilities of the device to which the data file is to be sent, for example in the file transfer path to a device such as light switch panel 104 does that device support an adapted OTA or does it support a schedules command class, 2) for each transport option to the destination device, what is available bandwidth to the receiving device, 3) for each transport option to the destination device what is the historical or latest error rate to the receiving device, 4) could multiple transport methods be used for example by using the z-wave mesh and a portion of the file may be sent using specially encoded data into transparent data payloads for the Schedules command class while a different portion of the file may be sent using the OTA file transfer.

Additionally or alternatively, an option may be using a new 2-way data file transfer command class. After gathering the transport medium characteristics and options then the segmentation method is given the information on how to segment up the data file and where to pass it on to one or multiple transport interfaces. This produces one or more segmented manifests each for one or multiple transport methods. A segment transport manager is triggered and each transport interface parses the respective transport specific manifest to send the segment of data to the destination. The segment transport manager may include an error checking and recovery step and may decide to change one or multiple transport paths during the active file transfer.

The reassembly logic similarly has a reciprocal set of steps performed by a similar segment transport manager in the other device 1) it may first respond to help gather measurement characteristics to help characterize the capability of a segment transport type 2) receives and manages local storage for the actual segmentation manifest based on the one or multiple transport methods chosen 3) may get an update to the one or more segmentation manifests. For example one of the transport methods may get blocked or prevented from operating during the data transfer process and requires an extension manifest update to occur over the other working transport interfaces.

In some implementations, the light switch panel 104 may be configured to display current status conditions of the monitored property 102 along with the status of the one or more lights at the property 102. For example, the light switch panel 104 may display the alarm condition such as fire alarm, current time, and weather data. In some examples, the light switch panel 104 may display the HVAC system status from HVAC components 437 or thermostat 434. For example, the light switch panel 104 may display the current temperature of the property 102, or thermostat 434. In the examples where the monitored property 102 includes one or more light switch panels 104, the user may configure the data to be displayed on each of the one or more light switch panels 104. For example, the user may access the light switch panel 104 to select the data to display on the specific panel. In some implementations, the light switch panel 104 may display text data indicating when the monitored property 102 is in an energy saving mode. In these implementations, when the monitored property 102 is in an energy saving mode, the light switch panel 104 may restrict the use of one or more lights 112 or other devices.

In some examples, the user may access the smart home application 442 on their user devices 440 or 450 to remotely switch a light 112 on or off. During set up of the user's profile on the smart home application, the user may provide one or more user image files to be stored in association with the user profile. When the user accesses the smart home application 442 to remotely switch a light 112 on or off, the light switch panel 104 may display the user image. For example, when a user John switches on the light 112, through the smart home application 442, the light switch panel 104 displays the user image, and a text file indicating that John switched on light 112. The light switch panel 104 may be configured to display the user image of the user account associated with changing the status of light 112.

In some implementations, the light switch panel 104 may act as an integrated security device 480 at the property 102. In these implementations, the user may view the current armed status of the home monitoring system 400 and perform one or more actions of the home monitoring system 400. For example, the user may arm and or disarm the home monitoring system 400 at the light switch panel 104.

In some implementations, the monitored property 102 may include one or more other z-wave capable devices. In these implementations, the control unit 106 may transfer one or more audio files, image files, and/or text files to the one or more z-wave capable devices as described above. For example, the property 102 may include a z-wave capable doorbell chime device 458. The chime device 458 may output an audible chime when a visitor arrives at the property 102 and presses the button on or is detected by a smart doorbell, or a sensor 420 detects motion or other events. The control unit 106 may be configured to transfer one or more audio files, image files, and/or text files to the chime device 458 via z-wave communication. The user may access the smart home application 442 to assign a particular chime to a user. The monitoring system 400 at the property 102 may be configured to determine the identity of a visitor when the visitor presses the but on or is detected by a smart doorbell at the property 102. The monitoring system 400 may utilize video analytics and/or facial recognition software to identify the user. The doorbell chime device is configured to output a selected audible chime, announcement, text to speech message, associated with a user based on the determined identity of the user, or not output anything.

Figure 2:
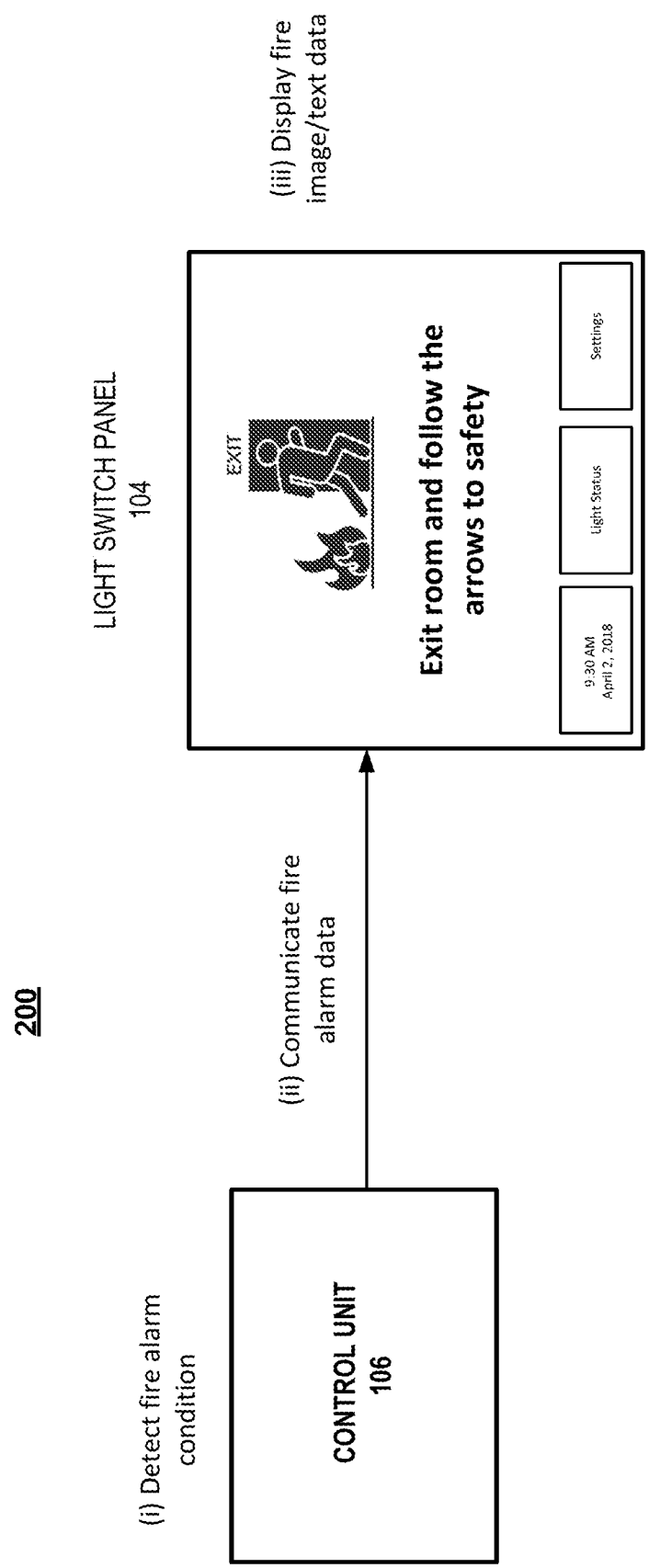
FIG. 2 illustrates an example of a display at a light switch panel.

FIG. 2 illustrates an example of a display at a light switch panel. As illustrated, the control unit 106 at the monitored property 102 may detect a fire alarm condition. The control unit 106 may detect a fire alarm condition based on received sensor 110 data. For example, the monitor control unit 106 may receive sensor 110 data from a smoke detector. In some implementations, the monitor control unit 106 may generate an audible alarm when the control unit 106 detects a fire alarm condition. For the example illustrated in FIG. 2, the monitor control unit 106 communicates the fire alarm data to the light switch panel 104. The light switch panel 104 may be a z-wave capable device that is configured to display status information. The light switch panel 104 may be mounted to a wall near the entrance of a room. For example, the light switch panel 104 may be mounted to the wall near the door to the master bedroom. In some examples, the light switch panel 104 may replace the traditional light switch in a room. In some implementations, the monitored property 102 may be integrated with one or more light switch panels 104. The one or more light switch panels 104 may be located throughout the property 102. For example, each room of the property 102 may be integrated with a light switch panel 104.

The light switch panel 104 may be configured to directly or indirectly control, and provide a status of the one or more lights 112 throughout the monitored property. In some examples, where each room of the property is integrated with a light switch panel 104, the light switch panel 104 may directly control one or more lights by switching their power supply or other methods and may display the status of one or more lights 112 within the particular room. For example the light switch panel 104 may indicate that light A is switched on, and how much power it is consuming. In other examples, where the monitored property is integrated with a single light switch panel 104, the light switch panel 104 may be mounted to a wall of a room selected by the resident. For example, the light switch panel 104 may be mounted to the wall in the master bedroom or the kitchen, and may directly or indirectly control and display the status of the one or more lights throughout the property 102.

The light switch panel 104 may be configured to display status data associated with the monitoring system 400 at the property 102. For example, the light switch panel 104 may indicate the armed status of the monitored property, the current weather conditions, the current thermostat 434 temperature, the current energy consumption of the property, and any other suitable data associated with the property. As illustrated in FIG. 2, the light switch panel 104 display may the current date and time, the status of one or more lights, and any other settings data.

When the monitor control unit 106 detects the alarm condition and communicates the alarm condition to the light switch panel 104, the light switch panel 104 may display image and/or text data specific to the detected alarm condition. The monitor control unit 106 may communicate the alarm condition data via Z-Wave, Bluetooth, or some other forms of wireless or wired communication. As illustrated, the light switch panel 104 displays text data instructing the occupants to exit the room. In some implementations, the light switch panel 104 may identify a safe exit route for the occupants of the property 102. For example, the light switch panel 104 may be configured to turn on or off directly connected lights 112 to assist in the safe exit for the occupants of the property 102. Implementations where the monitored property 102 is integrated with one or more connected doorknob devices, the light switch panel 104 may turn on lights 112 along the exit route and instruct the occupants to follow the green LEDs on the connected doorknobs to safety. In some implementations, the light switch panel 104 may turn on lights 112 and output an audible chime file to alert the occupants to the detected fire alarm condition.

In some implementations, the light switch panel 104 may have a normal state where the light switch panel acts as a switch for exactly one light/appliance/circuit. For example, the light switch panel 104 may typically be in the normal state, e.g., 99% of the time, and in the normal state display a state of the light 112 and be ready to receive input to the light 112 with the majority of its screen area (or mechanical input devices). The light switch panel 104 may be put into other modes manually, e.g., by pressing a small onscreen button, pressing and holding one or more mechanical input devices, or clapping at it.

Figure 3:
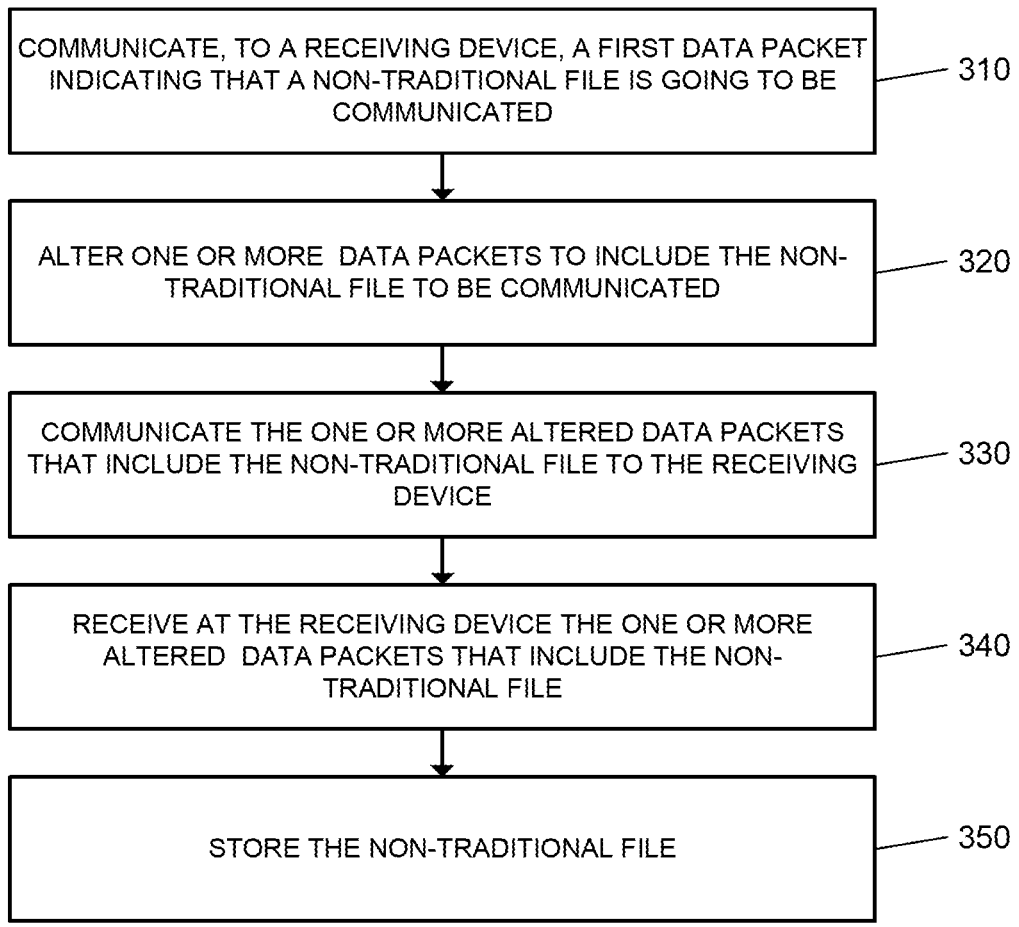
FIG. 3 is a flow chart of an example process for storing a non-traditional file at a light switch panel.

FIG. 3 illustrates an example process 300 for storing a non-traditional file. The monitoring system communicates a first data packet to a receiving device (310). The first data packet may indicate to the receiving device that the monitor control unit 106 may communicate a non-traditional file type to the receiving device. For example, the first data packet may indicate that an audio file may be communicated to a light switch panel 104. A non-traditional file is a file that is not traditionally communicated with a particular communication protocol. For example, a non-traditional file for z-wave communication may include audio files, text files, image files, or any other appropriate media file. The first data packet may be a data packet that includes a source, a destination, data, and a size. The data portion of the first data packet may include data that indicates that a non-traditional file may be communicated by a specific communication protocol. For example, the data portion may indicate that a chime file may be communicated by z-wave to the light switch panel 104. The non-traditional file may be a text file, an audio file, an image data, or any other suitable media file that is not traditionally communicated over a z-wave communication protocol. The first data packet may indicate the number of data packets that will be included in the data transmission. The monitoring system alters one or more data packets to include the non-traditional to be communication (320). In some implementations, the control unit 106 may be configured to alter a schedule portion of one or more data packets to communicate the non-traditional file over z-wave. In these implementations, the monitoring system may alter the one or more schedule identifiers (IDs) available over the z-wave network at the monitored property 102. For example, the monitoring system may alter the schedule IDs to embed at least a portion of a non-traditional file in a single data packet. In some examples, the monitoring system may alter the schedule IDs to embed at least a portion of a non-traditional file in one or more data packets.

The monitoring system communicates the one or more altered data packets that include the non-traditional file to the receiving device (330). In some implementations, the monitoring system may communicate the one or more data packets via z-wave to the light switch panel 104. Altering the one or more schedule IDs allows the system to embed the non-traditional files within the schedule IDs to facilitate the communication of the non-traditional files over z-wave. The system may communicate up to 64 kilobytes of non-traditional data files via z-wave through the use of the scheduling IDs.

In some implementations, the monitoring system may communicate the one or more altered data packets that include the non-traditional data files to the light switch panel 104 during a configuration of the panel. For example, the monitoring system may communicate one or more chime files or image files to the light switch panel 104 during configuration. In other implementations, the monitoring system may communicate the non-traditional data files to the light switch panel 104 when prompted by a resident of the property. For example, the resident may wish to update the one or more chimes output from the light switch panel 104. The resident may access a smart home application on the resident's user devices 440 or 450 to select one or more chimes to output from the panel 104. For example, the user may select to update the chimes to include Holiday music, or the sound of a pump-action shotgun being pumped to deter burglary of the property 102. The monitoring system may then communicate the one or more altered data packets that include the Holiday music or shotgun chime files to the light switch panel 104, or chime device 458.

The receiving device receives the one or more altered data packets that include the non-traditional file (340). The receiving device may be configured to decode the one or more altered data packets that include the non-traditional files. For example, the application software running at the light switch panel 104 decodes the one or more data packets to access chime data. For example, the receiving device may decode the one or more data packets to access the one or more portions of the chime data, and may compile the one or more portions of the chime data into a single chime file.

In some implementations, the monitoring control unit 106 may communicate a data packet to the receiving device that includes the data that provides the receiving device with the instructions to decode the received data. For example, the monitoring control unit 106 may communicate a data packet to a smart doorbell providing instructions to decode received chime data. The receiving device stores the non-traditional file (350). The receiving device may store the received non-traditional file in its memory.

In some implementations, the monitoring system communicates an adapted boot file to the receiving device over the OTA file transfer method. For example, when the receiving device is a OTA capable z-wave device, the monitoring system communicates an adapted boot file to the device. The adapted boot file may include a header that notifies the light switch panel 104 that the boot file is an adapted boot file. When the adapted boot file is communicated to light switch panel 104, the light switch panel 104 determines that the adapted boot file is an application file based on the data in the header of the adapted boot file. The light switch panel 104 triggers an application layer to run the application file to output the image file, the audio file, or the text file. For example, the monitoring system may communicate an application file, that when executed outputs one or more audio file at a chime device 458.

Figure 4:
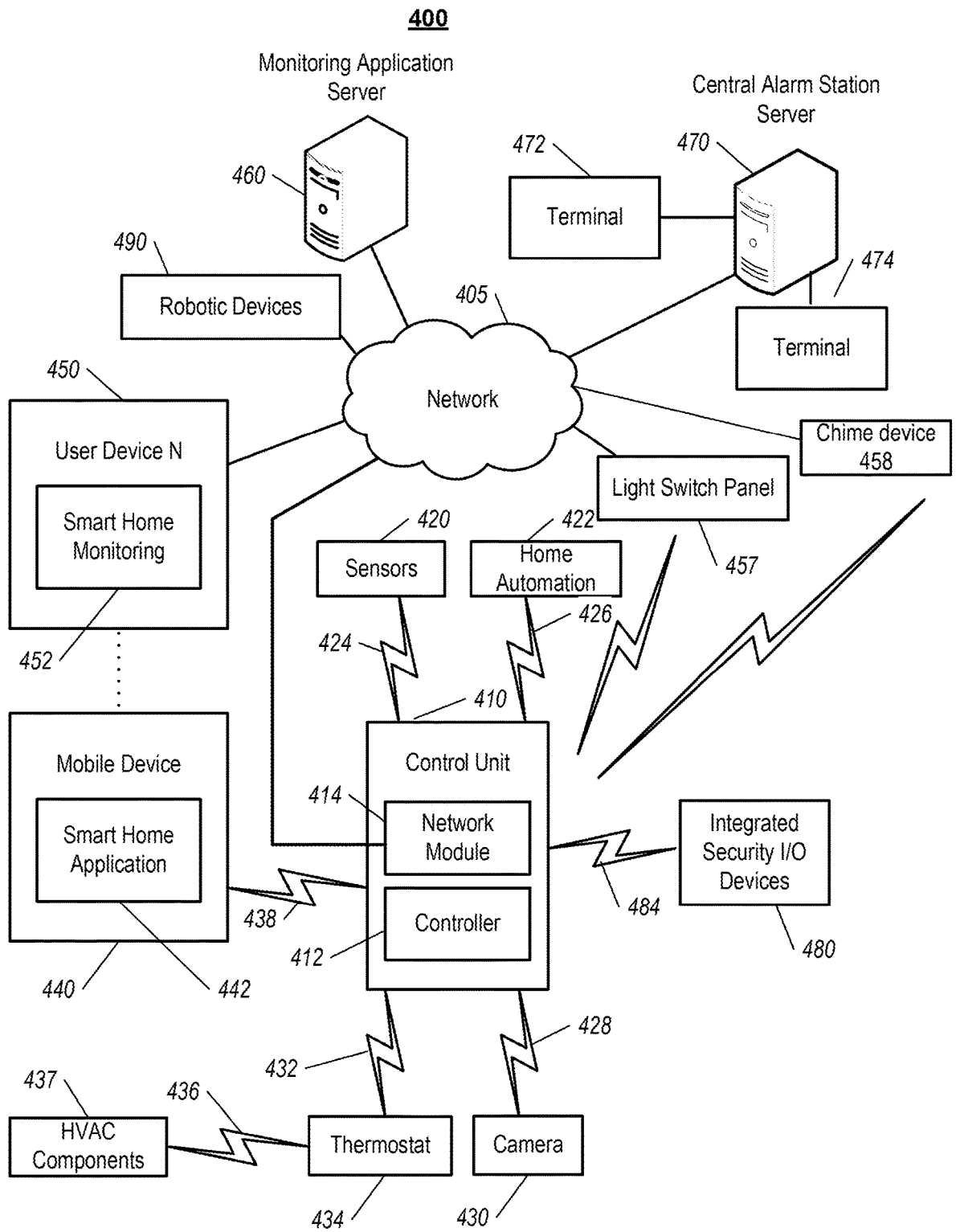
FIG. 4 illustrates an example of a monitoring system integrated with a light switch panel.

FIG. 4 is a diagram illustrating an example of a home monitoring system 400. The electronic system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, one or more smart doorbells, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system.

In these examples, the controller 412 may be configured to receive input from sensors, flow meters, smart doorbells, or other devices included in the control unit system and control operations of devices included in the household (e.g., speakers, lights 112, light switch panels 457, chime devices 458, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 may include one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data. The sensors 420 can also include a radio-frequency identification (RFID) sensor that identifies a particular article that includes a pre-assigned RFID tag. Additionally light switch panels 457, smart doorbells, electrical energy usage monitors, smart power meters, cameras 430, thermostats 434, and home automation 422 devices are sensors that may be included.

The control unit 410 communicates with the home automation controls 422 and a camera 430 to perform monitoring. The home automation controls 422 are connected to one or more devices that enable automation of actions in the home. For instance, the home automation controls 422 may be connected to one or more light switch panels 457, and may be configured to control operation of the one or more lights 112 connected to a light switch panel 457. Also, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a light switch panel 457 to turn on a light 112 to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420. In some examples, the camera 430 triggers integrated or external illuminators (e.g., Infra-Red, Z-wave controlled "white" lights, lights controlled by the home automation controls 422 including lighting switch panel 457, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412. In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 includes one or more light switch panels 457. Each of the one or more switch panels are display panels that may be mounted to the wall of a room, and are configured to display user configurable content. In some examples, the one or more light switch panels 457 may be e-ink, LCD, OLED, or any other appropriate display panel. A light switch panel is a z-wave capable or otherwise remotely controllable device that is configured to communicate with the control unit 410 at the monitored property. The light switch panel displays the status of the one or more lights at the monitored property.

The system 400 includes one or more chime devices 458. Each of the one or more chime devices 458 are capable of audio output. Chime devices are z-wave capable or otherwise remotely controllable devices. The monitoring system may be in communication with the one or more chime devices.

The monitor control unit 410 is configured to communicate with each of the one or more light switch panels 457, and each of the one or more chime devices 458. The monitor control unit 410 may communicate non-traditional files, such as, image files, audio files, and text files to each of the light switch panel 457 and the chime device 458. The monitoring control unit may communicate with the z-wave capable devices by adjusting the schedule command class of a data file, or by using an over the air transfer method.

In some examples, the light switch panels 457 may include data capture and recording devices. In these examples, the light switch panels 457 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the light switch panels 457 to take and store a biometric sample that can be used to identify the person (e.g., a biometric sample with DNA that can be used for DNA testing). In some implementations, the light switch panels 457 may include output devices. In these implementations, the light switch panels 457 may include one or more displays, one or more speakers, and/or any type of output devices that allow the light switch panels 457 to communicate information to a nearby user.

The light switch panels 457 also may include a communication module that enables the light switch panels 457 to communicate with the control unit 410, each other, and/or other devices. The communication module may be a wireless communication module that allows the light switch panels 457 to communicate wirelessly. For instance, the communication module may be a Wi-Fi module that enables the light switch panels 457 to communicate over a local wireless network at the home. The communication module further may be a 900 MHz wireless communication module that enables the light switch panels 457 to communicate directly with the control unit 410. Other types of short-range wireless communication protocols, such as Bluetooth, Bluetooth LE, Z-wave, Zigbee, etc., may be used to allow the light switch panels 457 to communicate with other devices in the home. In some implementations, the light switch panels 457 may communicate with each other or with other devices of the system 400 through the network 405.

The light switch panels 457 further may include processor and storage capabilities. The light switch panels 457 may include any suitable processing devices that enable the light switch panels 457 to operate applications and perform the actions described throughout this disclosure. In addition, the light switch panels 457 may include solid state electronic storage that enables the light switch panels 457 to store applications, configuration data, collected sensor data, and/or any other type of information available to the light switch panels 457.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing). In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station. In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490. Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480 or light switch panels 457. Additionally, the one or more control units 410 may receive one or more sensor data from the sensors 420 and determine whether to provide an alert to the one or more integrated security input/output devices 480.

The sensors 420, the home automation controls 422 including light switch panels 457 and chime devices 458, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422 including light switch panels 457 and chime devices 458, the camera 430, the thermostat 434, and the integrated security devices 480 to the controller 412. The sensors 420, the home automation controls 422 including light switch panels 457 and chime devices 458, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422 including light switch panels 457 and chime devices 458, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450. In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450. The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information. In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, the robotic devices 490, the light switch panel 457, and the chime device 458. The one or more user devices 440 and 450 receive data directly from the sensors 420, the home automation controls 422, the camera 430, the robotic devices 490, the light switch panel 457, and the chime device 458 and sends data directly to the sensors 420, the home automation controls 422, the camera 430, the robotic devices 490, and the light switch panel 457, and the chime device 458. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, the robotic devices 490, the light switch panel 457, and the chime device 458 are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, the robotic devices 490, the light switch panel 457, and the chime device 458 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, the robotic devices 490, the light switch panel 457, and the chime device 458 to a pathway over network 405 when the one or more user devices 440 and 450 are farther from the sensors 420, the home automation controls 422, the camera 430, the thermostat 434, the robotic devices 490, the light switch panel 457, and the chime device 458. In some examples, the system leverages GPS information from the one or more user devices 440 and 450 to determine whether the one or more user devices 440 and 450 are close enough to the sensors 420, the home automation controls 422, the camera 430, the thermostat 434, the robotic devices 490, the light switch panel 457, and the chime device 458 to use the direct local pathway or whether the one or more user devices 440 and 450 are far enough from the sensors 420, the home automation controls 422, the camera 430, the thermostat 434, the robotic devices 490, the light switch panel 457, and the chime device 458 that the pathway over network 405 is required. In other examples, the system leverages status communications (e.g., pinging) between the one or more user devices 440 and 450 and the sensors 420, the home automation controls 422, the camera 430, the thermostat 434, the robotic devices 490, the light switch panel 457, and the chime device 458 to determine whether communication using the direct local pathway is possible. If communication using the direct local pathway is possible, the one or more user devices 440 and 450 communicate with the sensors 420, the home automation controls 422, the camera 430, the thermostat 434, the robotic devices 490, the light switch panel 457, and the chime device 458 using the direct local pathway. If communication using the direct local pathway is not possible, the one or more user devices 440 and 450 communicate with the sensors 420, the home automation controls 422, the camera 430, the thermostat 434, the robotic devices 490, the light switch panel 457, and the chime device 458 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

Figure 5:
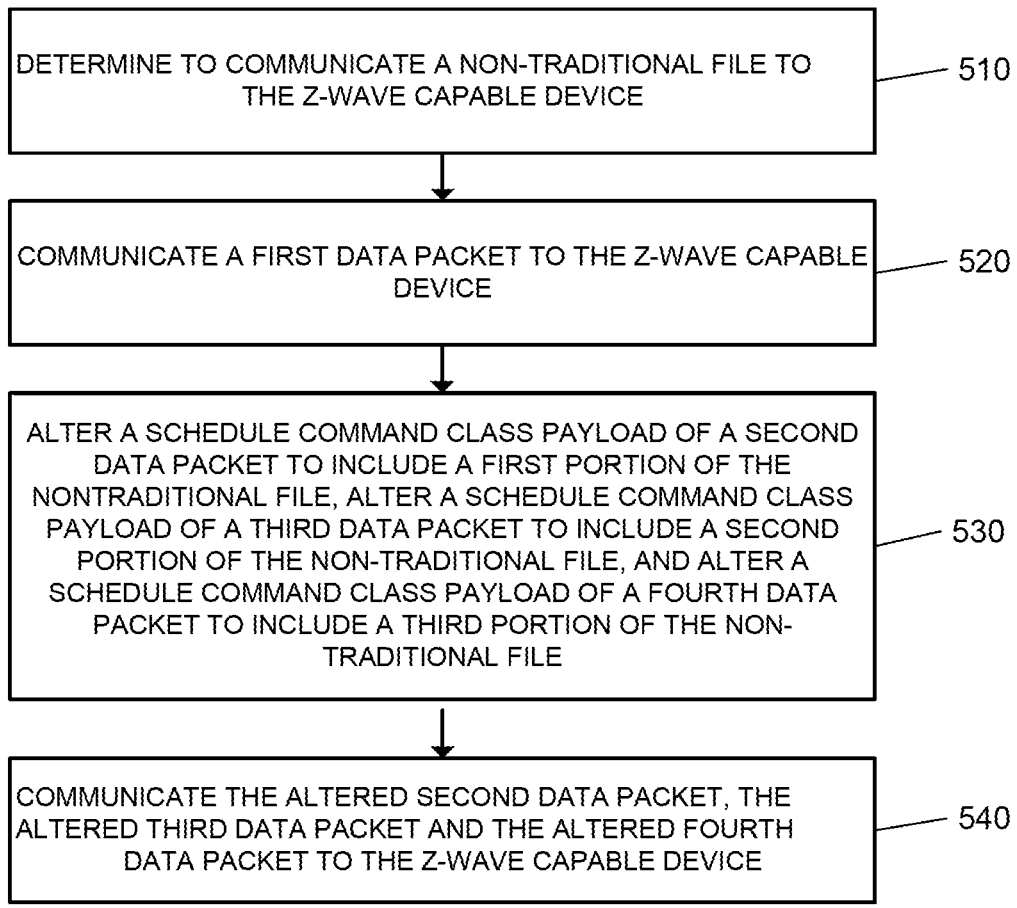
FIG. 5 illustrates an example process for communicating a non-traditional file to a z-wave capable device.

FIG. 5 illustrates an example process 500 for communicating a non-traditional file to a z-wave capable device. The process 500 may be performed by a monitoring control unit 106 that manages the monitoring system at a property 102, and that is in communication with one or more z-wave capable devices located throughout the monitored property 102. The process includes the monitoring control unit determining to communicate a non-traditional file to the z-wave capable device (510). For example, the monitoring control unit 106 determines to communicate an image file to a light switch panel 104. A non-traditional file is a file that is not typically communicated through the z-wave communication protocol. For example, a non-traditional file may be an image file, an audio file, or a text file.

The monitoring control unit 106 may determine to communicate a non-traditional file, such as an image file to the z-wave capable light switch panel based on a user set timing schedule that indicates a time when the image file should be made available at the light switch panel 104. In some examples, the monitoring control unit 106 may determine to communicate an audio file to a z-wave capable chime device. The monitoring control unit 106 may determine to communicate the audio file to the z-wave capable chime device based on receiving a request from a user device of a resident of the monitored property 102. In other examples, the monitoring control unit 106 may determine to communicate a text file to the light switch panel 104. In some implementations, the monitoring control unit 106 may determine to communicate the non-traditional files during the configuration of the monitoring system. For example, when the resident of the monitored property 102 is setting up the light switch panel or setting up the chime device.

The monitoring control unit communicates a first data packet to the z-wave capable device based on determining to communicate a non-traditional file to the z-wave capable device (520). For example, the monitoring control unit 106 communicates a first data packet to the light switch panel 104. The first data packet may indicate to the z-wave capable device that a non-traditional file is going to be communicated to the device. In some examples, the first data packet may indicate the number of data packets that will be included in the data transmission. The first data packet may include a source, a destination, data, and a size. The data portion of the first data packet may include data that indicates that a non-traditional file may be communicated by a z-wave communication protocol.

The monitoring control unit alters a schedule command class payload of a second data packet to include a first portion of the non-traditional file, alters the schedule command class payload of a third data packet to include a second portion of the non-traditional file, and alters a schedule command class payload of a fourth data packet to include a third portion of the non-traditional file (530). For example, the monitoring control unit 106 alters a schedule command class payload of a second data packet to include a first portion of an image file, alters the schedule command class payload of a third data packet to include a second portion of the image file, and alters a schedule command class payload of a fourth data packet to include a third portion of the image file. The monitoring control unit 106 may include a segment transport manager that is configured to alter the schedule command class payload of each of the one or more data packets that will be communicated to the z-wave capable device. In some examples, the non-traditional file to be communicated to the z-wave device may be a larger file, and may need to be portioned into four or more data packets to be communicated to the z-wave capable device.

The monitoring control unit communicates the altered second data packet, the altered third data packet, and the altered fourth data packet to the z-wave capable device (540). For example, the monitoring control unit 106 communicates the altered data packets to a chime device via a z-wave communication protocol. The monitoring control unit 106 may be configured to communicate up to 64 kilobytes of non-traditional data files via z-wave through the use of the schedule command class payload of the one or more data packets.

The z-wave capable device receives the altered second, third, and fourth data packet and is configured to extract from the altered data packets the first, second, and third portions of the non-traditional file. The z-wave capable device may be configured to reassemble the first, second, and third portion of the non-traditional file, and store the non-traditional file in memory. In some examples, the first data packet received from the monitoring control unit 106 includes instructions to extract the one or more portions of the non-traditional file from the altered data packets, and the instructions to reassemble the one or more portions of the traditional file. In other examples, the monitoring control unit 106 may communicate a fifth data packet that includes instructions for the z-wave capable device to decode the altered second, third, and fourth data packet to extract the first, second, and third portions of the non-traditional file. The monitoring control unit 106 may communicate a sixth data packet that includes instructions for the z-wave capable device to reassemble the first portion, the second portion, and third portions of the non-traditional file.

In some implementations, the monitoring control unit 106 may determine to communicate a non-traditional file to the z-wave capable device by an over the air communication method. For example, the monitoring control unit 106 may determine to communicate an audio file to a z-wave capable chime device by an over the air communication method. In these implementations, the monitoring control unit 106 communicates an adapted boot file to the z-wave capable device. The adapted boot file may include a header that notifies the receiving z-wave capable device that the boot file is an adapted boot file. When the z-wave capable device receives the adapted boot file, the receiving device may trigger an application layer of the adapted file to run the application file to output the non-traditional file. For example, a chime device may receive the adapted file, and run the application file to output the audio file.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
    a z-wave capable device that is configured to communicate with a monitoring control unit; and
    the monitoring control unit that is configured to:
        determine to communicate a non-traditional file to the z-wave capable device;
        based on determining to communicate the non-traditional file to the z-wave capable device, communicate a first data packet to the z-wave capable device;
        based on communicating the first data packet to the z-wave capable device, alter a schedule command class payload of a second data packet to include a first portion of the non-traditional file, alter a schedule command class payload of a third data packet to include a second portion of the non-traditional file, and alter a schedule command class payload of a fourth data packet to include a third portion of the non-traditional file; and
        communicate, to the z-wave capable device, the altered second data packet, the altered third data packet, and the altered fourth data packet.

2. The monitoring system of claim 1, wherein the z-wave capable device that is configured to communicate with the monitoring control unit is a light switch panel that is configured to display data.

3. The monitoring system of claim 1, wherein the z-wave capable device that is configured to communicate with the monitoring control unit is a chime device that is configured to output audio data.

4. The monitoring system of claim 1, wherein the first data packet indicates that a non-traditional file is going to be communicated and a number of data packets that will be included in the data transmission.

5. The monitoring system of claim 1, wherein the monitoring control unit is configured to determine to communicate a non-traditional file to the z-wave capable device:
receiving, from a user device of a resident of the property a timing schedule that identifies a time when an image file should be available at a light switch panel; and
based on receiving, from the user device of the resident of the property the timing schedule that identified the time when the image file should be available at the light switch panel, determining to communicate the image file by z-wave communication.

6. The monitoring system of claim 1, wherein the monitoring control unit is configured to determine to communicate a non-traditional file to the z-wave capable device by:
receiving, from a user device of a resident of the property, a request to have an audio file available at a chime device; and
based on receiving, from the user device of the resident of the property, the request to have an audio file available at the chime device, determining to communicate the audio file by z-wave communication.

7. The monitoring system of claim 1, wherein the monitoring control unit is configured to determine to communicate a non-traditional file to the z-wave capable device by determining to communicate a text file to the light switch panel by z-wave communication.

8. The monitoring system of claim 1, wherein the monitoring control unit is configured to communicate a fifth data packet that includes instructions for the z-wave capable device to decode the altered second data packet, the altered third data packet, and the altered fourth data packet.

9. The monitoring system of claim 1, wherein the monitoring control unit is configured to communicate a sixth data packet that includes instructions for the z-wave capable device to reassemble the first portion, the second portion, and the third portion of the non-traditional file.

10. The monitoring system of claim 1, wherein the z-wave capable device is configured to:
receive the altered second data packet, the altered third data packet, and the altered fourth data packet;
extract from the altered second data packet, the altered third data packet, and the altered fourth data packet, the first portion, the second portion, and third portion of the non-traditional file;
reassemble the first portion, the second portion, and third portion of the non-traditional file; and
store the reassembled non-traditional file in memory.

11. The monitoring system of claim 1, wherein determining to communicate a non-traditional file to the z-wave capable device comprises determining to communicate a non-traditional file by an over the air communication method; and
based on determining to communicate the non-traditional file to the z-wave capable device over the over the air communication method, communicate, to the z-wave capable device, an adapted boot file, wherein a header of the adapted boot file indicates that the file is adapted.

12. The monitoring system of claim 11, wherein the z-wave capable device is configured to receive the adapted boot file, determine the adapted boot file is an application file based on the header of the adapted boot file, and trigger an application layer of the adapted boot file to run the application file to output an audio file.

13. A computer-implemented method comprising:
determining to communicate a non-traditional file to a z-wave capable device;
based on determining to communicate the non-traditional file to the z-wave capable device, communicate a first data packet to the z-wave capable device;
based on communicating the first data packet to the z-wave capable device, alter a schedule command class payload of a second data packet to include a first portion of the non-traditional file, alter a schedule command class payload of a third data packet to include a second portion of the non-traditional file, and alter a schedule command class payload of a fourth data packet to include a third portion of the non-traditional file; and
communicate, to the z-wave capable device, the altered second data packet, the altered third data packet, and the altered fourth data packet.

14. The method of claim 13, wherein the z-wave capable device that is configured to communicate with the monitoring control unit is a light switch panel that is configured to display data.

15. The method of claim 13, wherein the z-wave capable device that is configured to communicate with the monitoring control unit is a chime device that is configured to output audio data.

16. The method of claim 13, wherein the first data packet indicates that a non-traditional file is going to be communicated and a number of data packets that will be included in the data transmission.

17. The method of claim 13, wherein the monitoring control unit is configured to determine to communicate a non-traditional file to the z-wave capable device:
receiving, from a user device of a resident of the property a timing schedule that identifies a time when an image file should be available at a light switch panel; and
based on receiving, from the user device of the resident of the property the timing schedule that identified the time when the image file should be available at the light switch panel, determining to communicate the image file by z-wave communication.

18. The method of claim 13, wherein the monitoring control unit is configured to determine to communicate a non-traditional file to the z-wave capable device by:
receiving, from a user device of a resident of the property, a request to have an audio file available at a chime device; and
based on receiving, from the user device of the resident of the property, the request to have an audio file available at the chime device, determining to communicate the audio file by z-wave communication.

19. The method of claim 13, wherein the monitoring control unit is configured to determine to communicate a non-traditional file to the z-wave capable device by determining to communicate a text file to the light switch panel by z-wave communication.

20. A non-transitory computer-readable medium storing software comprising instructions executable by one or more computers which, upon such execution, cause the one or more computers to perform operations comprising:
determining to communicate a non-traditional file to a z-wave capable device;
based on determining to communicate the non-traditional file to the z-wave capable device, communicate a first data packet to the z-wave capable device;
based on communicating the first data packet to the z-wave capable device, alter a schedule command class payload of a second data packet to include a first portion of the non-traditional file, alter a schedule command class payload of a third data packet to include a second portion of the non-traditional file, and alter a schedule command class payload of a fourth data packet to include a third portion of the non-traditional file; and communicate, to the z-wave capable device, the altered second data packet, the altered third data packet, and the altered fourth data packet.

\* \* \* \* \*